US012636654B2

(12) United States Patent
Brothier et al.

(10) Patent No.: US 12,636,654 B2
(45) Date of Patent: May 26, 2026

(54) METHOD FOR GRINDING POWDERS, METHOD FOR COATING A MATERIAL, METAL PARTICLES, COATED MATERIAL AND USES OF THESE

(71) Applicant: COMMISSARIAT À L'ÉNERGIE ATOMIQUE ET AUX ÉNERGIES ALTERNATIVES, Paris (FR)

(72) Inventors: Meryl Brothier, Aix en Prvovence (FR); Stéphane Vaudez, Avignon (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 231 days.

(21) Appl. No.: 18/256,795

(22) PCT Filed: Dec. 8, 2021

(86) PCT No.: PCT/FR2021/052244
§ 371 (c)(1),
(2) Date: Jun. 9, 2023

(87) PCT Pub. No.: WO2022/123178
PCT Pub. Date: Jun. 16, 2022

(65) Prior Publication Data

US 2024/0042453 A1 Feb. 8, 2024

(30) Foreign Application Priority Data

Dec. 10, 2020 (FR) ....................................... 2013001

(51) Int. Cl.
*B02C 17/10* (2006.01)
*B02C 17/18* (2006.01)
*B02C 17/20* (2006.01)

(52) U.S. Cl.
CPC ............ *B02C 17/10* (2013.01); *B02C 17/186* (2013.01); *B02C 17/205* (2013.01)

(58) Field of Classification Search
CPC ...... B02C 17/10; B02C 17/186; B02C 17/205
See application file for complete search history.

(56) References Cited

U.S. PATENT DOCUMENTS

2004/0177723 A1 9/2004 Van Daam
2018/0318778 A1 11/2018 Brothier et al.

FOREIGN PATENT DOCUMENTS

CN 104275489 A 1/2015
CN 106623951 A 5/2017
(Continued)

OTHER PUBLICATIONS

Search Report for French application No. FR2013001dated Aug. 10, 2021.

(Continued)

*Primary Examiner* — Ricardo D Morales
(74) *Attorney, Agent, or Firm* — Chrisman Gallo Tochtrop LLC

(57) ABSTRACT

A method for the cryogenic grinding of at least one powder comprising the following steps: (a) introducing a cryogenic fluid into an attrition mill comprising attrition means, (b) introducing the powder or powders into the attrition mill, and (c) setting the attrition mill in rotational motion, and wherein—the ratio $V_{MA}/(V_{MA}+V_{FC})$ of the volume of the attrition means $V_{MA}$ to the sum of the volume of the attrition means $V_{MA}$ and the volume of the cryogenic fluid VFC is comprised between 0.2 and 0.8, and the rotational speed of the attrition mill during step (c) is between 100 rpm and 20,000 rpm. Further, particles of metal or metal alloy, to the use thereof, to a coating method employing them and to the use of such a coated material.

22 Claims, 8 Drawing Sheets

(56) References Cited

FOREIGN PATENT DOCUMENTS

| | | | | |
|---|---|---|---|---|
| FR | 2852263 | A1 | 9/2004 | |
| FR | 3072308 | A1 * | 4/2019 | ............. B02C 25/00 |
| GB | 1508941 | A | 4/1978 | |
| JP | 2012-509395 | A | 4/2012 | |
| WO | 2017076944 | A1 | 5/2017 | |

OTHER PUBLICATIONS

International Search Report for PCT/FR2021/052244 dated May 6, 2022.
Written Opinion for PCT/FR2021/052244 dated May 6, 2022.

* cited by examiner

METHOD FOR GRINDING POWDERS, METHOD FOR COATING A MATERIAL, METAL PARTICLES, COATED MATERIAL AND USES OF THESE

CROSS-REFERENCE TO RELATED APPLICATIONS

This is a National Stage application of PCT international application PCT/FR2021/052244, filed on Dec. 8, 2021, which claims the priority of French Patent Application No. FR 2013001, filed Dec. 10, 2020, both of which are incorporated herein by reference in their entirety.

TECHNICAL FIELD

The present invention relates to a method for cryogenic-fluid grinding one or more powders and, in particular, a metal powder.

The invention also relates to metal particles being characterised by a particular three-dimensional structure, such particles being likely to be obtained by the above-mentioned grinding method.

The invention also relates to the use of such metal particles.

Finally, the invention relates to a method for coating a material implementing these metal particles, especially to form a protective or facing metal coating of all or part of the material, as well as to the use of such a coated material.

STATE OF PRIOR ART

There are currently many methods for forming a metal coating or deposition onto a material or piece, wherein these methods can especially be gathered according to the technology implemented for depositing the coating and/or to the formulation which is deposited.

A metal coating can be obtained by applying metallised paints to the surface of a piece to be coated, for example by means of brushes, rollers or spray guns. However, the formulations of these paints resort to additives to disperse, stabilise and/or provide the viscosity and/or the wettability required for satisfactory application of these paints. In particular, these formulations implement solvents, some of which can be toxic, as well as volatile organic compounds (VOCs) whose negative effects on health and the environment are well known. Moreover, these formulations use metal compounds in amounts that are not optimised.

A metal coating can also be obtained by applying inks. There are many ink formulations, each being more particularly adapted to the nature of the material to be coated and/or to the contemplated use. However, some ink formulations are complex, toxic and/or unstable, especially due to the chemical interactions that can occur with the fine metal powders they contain. In particular, because of their small size, these metal powders oxidise easily.

A metal coating can also be obtained by a chemical vapour deposition (CVD) or physical vapour deposition (PVD) method. In the case of the CVD method, chemical precursors in the form of gases are brought to adapted temperatures and pressures to allow the desired depositions. Although the CVD method is relatively common, it has the drawback of requiring precursors that are not always available and/or may not be easy to implement. In the case of the PVD method, the material to be deposited is sprayed by ion or electron beams under controlled temperature and pressure conditions. However, both these CVD and PVD methods resort to the use of heavy industrial facilities, in particular to reactors that allow the management and control of the temperatures and pressures required to make depositions.

Powder deposition by co-grinding is a method that also allows a metal coating to be formed. This method consists in depositing a first material in powder form onto a second material, also in powder form. This method is conventionally carried out in a ball grinder by means of powders with controlled grain sizes. However, by definition, such a method is not adapted to form a metal deposit on a flat surface, and even less so if this flat surface is large.

The cold metallisation method, also known as the "cold spray" method, is another method for forming a metal coating. In this method, a heated metal powder is sprayed at very high speed by a pressurised gas onto the surface of a piece to be coated. It is the impact force of the powder particles on the surface that ensures the quality of the deposition. Although, as a function of this impact force, the cold metallisation method can make relatively uniform depositions, it does require the implementation of heavy industrial facilities with relatively expensive high-temperature (potentially greater than 1100° C.) and high-pressure heating and spraying equipment. Furthermore, this method generates relatively high powder losses.

For the sake of completeness, another method for making a metal coating can also be mentioned. This method is gold-foil deposition, which consists in depositing relatively fine gold foils (in the order of 0.1 μm to 0.2 μm) onto a surface. These gold foils, which are obtained by thorough prior hammering, are conventionally deposited manually onto the surface to be coated. Such a method is thus relatively small-scale and, consequently, unsuitable for industrial implementation.

As noted above, although the coating methods just described actually allow metal coatings to be made on a piece, they all have one or more drawbacks.

The purpose of the present invention is to overcome the drawbacks of these coating methods of prior art and, consequently, to provide a coating method which can be implemented industrially and which makes it possible to make a homogeneous metal deposition or coating onto a piece, whatever the shape of the latter, while limiting as much as possible the loss of metal material to be deposited, especially with a view to controlling industrial costs. Furthermore, this coating method should not implement compounds presenting health and/or environmental risks, nor should it use heavy and expensive industrial facilities of the type involved in CVD, PVD and cold spray methods. Moreover, this method has to allow a metal coating to be made both onto all or part of the surface of a piece and onto a material being in divided form, such as a powder.

Another purpose of the present invention is to provide not only metal particles which can be implemented in the above-mentioned coating method to overcome the drawbacks of the coating methods of prior art, but also a method for grinding a metal powder to obtain such metal particles.

Finally, and more generally, another purpose of the present invention is to provide a grinding method which is not limited solely to the grinding of a metal powder but which also applies to the grinding of other types of powders, such as ceramic powders or organic materials or even graphite powders.

FR 3 072 308 A1, which describes a method for grinding actinide powders, in particular actinide oxide powders such as $UO_2$, $PuO_2$ and/or $CeO_2$, is known. This grinding method is implemented by means of a cryogenic grinding device comprising, among other things, grinding media being in the form of solidified cryogenic gas.

DISCLOSURE OF THE INVENTION

The purposes stated above, as well as others, are achieved, firstly, by a method for cryogenic-fluid grinding at least one powder.

According to the invention, this method comprises the following steps:

introducing a cryogenic fluid into an attrition grinder comprising attrition means, (b) introducing the powder(s) into the attrition grinder, (c) rotatably moving the attrition grinder, whereby cryogenic grinding of the powder(s) into particles is carried out, and (d) optionally collecting the particles, each powder being advantageously selected from a metal powder, a metal alloy powder, a powder of one or more metal oxides, a ceramic powder, an organic powder and a graphite powder, the ratio $V_{MA}/(V_{MA}+V_{FC})$ of the attrition means volume $V_{MA}$ to the sum of the attrition means volume $V_{MA}$ and the cryogenic fluid volume $V_{FC}$ is between 0.2 and 0.8 and, advantageously, between 0.3 and 0.7, and the rotational speed of the attrition grinder during step (c) is between 100 rpm and 20,000 rpm.

The method according to the invention thus consists in grinding one or more powders by means of a cryogenic fluid, this grinding leading to obtaining one or more ground powders formed by particles having a grain size which is homogeneous, this homogeneity being characterised by a relatively tight and narrow grain size distribution, and which may, furthermore, be particularly fine and characterised by larger particle size values which may be less than 100 nm, such a homogeneous and, where appropriate, particularly fine grain size not being achievable with conventional grinding methods.

It is specified that the expression "between . . . and . . . " mentioned above and used in the present application has to be understood as defining not only the values of the interval but also the values of the bounds of this interval.

The method according to the invention is carried out by means of an attrition grinder which comprises, in its enclosure, attrition means, also called attrition media or mobiles.

These attrition means are formed by moveable elements which may be spherical or substantially spherical in shape. While the attrition media can thus take the form of beads, they can also take the form of bars or even rollers.

Whatever the shape of the attrition means, they are formed of a material having sufficient mechanical strength and hardness and are adapted to the nature of the powders to be ground.

Thus, in an advantageous version of the grinding method according to the invention, the attrition means are formed of steel or ceramic, the ceramic being especially zirconium carbide ZrC, tungsten carbide WC or zirconium dioxide $ZrO_2$, also known as zirconia.

In an advantageous variant, the attrition means are identical in terms of shape, size and constituent material. However, there is nothing to prevent the implementation of attrition means which are different in terms of shape, size and/or constituent material.

During step (a) of the grinding method according to the invention, a cryogenic fluid is introduced into the attrition grinder fitted with the attrition means.

By cryogenic fluid, it is meant a liquefied gas kept in the liquid state at low temperature, typically at a temperature below 0° C. This liquefied gas is chemically inert with respect to the powder(s) intended to be ground under the conditions of implementation of the method according to the invention.

This cryogenic fluid can especially be selected from nitrogen, argon and krypton. Preferably, the cryogenic fluid is nitrogen.

During step (b) of the grinding method according to the invention, the powder(s) intended to be ground are introduced into the attrition grinder fitted with attrition means.

This or these powders are advantageously selected from a metal powder, a metal alloy powder, a powder of one or more metal oxides, a ceramic powder, an organic powder and a graphite powder.

In other words, a single powder or, on the contrary, a mixture of two, three or even more different powders can be introduced into the attrition grinder.

By metal powder, it is meant a powder of a metal at its oxidation level 0. The metal may be selected from the metal elements of the Periodic Table of the Elements, especially from alkali metals, alkaline earth metals, transition metals, lanthanides and poor metals such as aluminium.

By metal alloy powder, it is meant a powder formed by combining at least two of the metal elements of the Periodic Table of the Elements.

By a metal oxide powder, it is meant an oxide powder of one of the metal elements of the Periodic Table of the Elements. When it is a powder of several metal oxides, it may be a powder formed of two or more distinct oxides of a same metal element or a powder formed of one or more oxides of two or more different metal elements.

When this powder is a ceramic powder, it can especially be selected from alumina, zirconia and mullite.

If the powder is an organic powder, it may especially be a medicinal powder.

There is nothing to prevent contemplating the grinding of a metalloid powder, for example boron powder.

Steps (a) and (b) may be implemented in any order.

However, in an advantageous variant of the method according to the invention, these steps (a) and (b) are implemented successively.

During step (c), the attrition grinder is rotatably moved, for example by means of a stirring shaft. Due to the presence of the attrition means and the cryogenic fluid, which is very cold and has a low viscosity and a low surface tension (compared with water), the powder(s) present in the enclosure of the attrition grinder are then subjected to concomitant impaction and shearing forces generated by the moving attrition means, which enables the powder(s) to be thoroughly ground. Indeed, the powder(s) will be embrittled by the temperature and the liquid phase formed by the cryogenic fluid will be able to penetrate deeply into the microcracks generated as the grinding progresses to promote the separation of the particles once ground. The grinding energy is thus used more effectively than in most conventional powder grinders, which are limited to deagglomerating the powders.

At the end of step (c), particles being in the form of a cryogenic suspension of particles are thus obtained. Kept in suspension, these particles are protected from any risk of oxidation.

Optionally, the grinding method according to the invention may further include a step (d) for collecting the particles, this collection step (d) being implemented after the actual grinding step (c).

After collection, the particles can be stored, advantageously under inerting by means of an inert gas, for example under nitrogen.

In a particular embodiment, the grinding method according to the invention further comprises, after step (c), at least one complementary step (c') of rotatably moving the attrition grinder.

The implementation of one or more complementary steps (c') makes it possible to reduce, if necessary, the size of the particles resulting from the cryogenic grinding of the powder in step (c) to the desired grain size.

This or these additional step(s) (c') may be carried out with attrition means distinct from those implemented during step (c). In particular, these attrition means may be of different shape, size and/or constituent material. Advantageously, the mean diameter of these complementary attrition means is smaller than the mean diameter of the attrition means implemented in step (c). However, whatever the attrition means used during the complementary step(s) (c'), the ratio $V_{MA}/(V_{MA}+V_{FC})$ always verifies the inequation $0.2 \leq V_{MA}/(V_{MA}+V_{FC}) \leq 0.8$ and, advantageously, $0.3 \leq V_{MA}/(V_{MA}+V_{FC}) \leq 0.7$.

This or these complementary step(s) (c') may be carried out either before or after the particle collection step (d).

However, in terms of saving time, it is preferable for this or these complementary step(s) (c') to be carried out before the particle collection step (d).

In an advantageous variant of the grinding method according to the invention, the cryogenic grinding of the powder(s) can be controlled or monitored in line, which makes it possible to determine when to interrupt step (c) and/or whether the implementation of one or more additional steps (c') is necessary, as a function of the state of progress of the grain size of the ground powder(s).

This grain size monitoring can especially be ensured in situ using a laser diffractometer, it being specified that the grain size measurement is facilitated by the transparent nature of the cryogenic fluid.

In a more particularly preferred variant of the grinding method according to the invention, the powder is a metal powder or a metal alloy powder, the metal(s) of the powder being selected from Au, Ag, Cu, Al, Sn, Pt, Pd, Pb, Zn, Fe and Ni, and the ratio $V_{MA}/(V_{MA}+V_{FL})$ is such that $0.2 \leq V_{MA}/(V_{MA}+V_{FL}) \leq 0.7$.

With these particular choices of implementation conditions and metals, all of which have a certain ductility combined with a certain malleability, the grinding method according to the invention makes it possible to prepare metal and metal alloy particles having very specific morphological characteristics which will be detailed below.

According to a particular embodiment, the metal(s) in the powder are selected from Au, Ag, Cu, Al, Sn, Pt, Pd, Zn and Fe, advantageously from Ag, Sn and Cu, the metal or one of the metals preferably being Cu.

Secondly, the invention relates to metal or metal alloy particles in the form of sheets having three dimensions denoted as e, I and L, e and L being respectively the smallest dimension and the largest dimension of the particles, and the metal(s) of the particles being selected from Au, Ag, Cu, Al, Sn, Pt, Pd, Pb, Zn, Fe and Ni.

According to the invention, these metal or metal alloy particles have the following morphological characteristics:

- e such that e≤1 μm, advantageously such that e≤200 nm and, preferably, such that 10 nm≤e≤100 nm,
- a ratio L/e such that 1≤L/e≤100,
- a specific surface area (measured using the BET method) greater than or equal to 1 $m^2/g$, advantageously greater than or equal to 10 $m^2/g$ and preferably between 25 $m^2/g$ and 200 $m^2/g$.

These metal or metal alloy particles have very specific morphological characteristics. Indeed, these particles are formed by very thin sheets, with a mean aspect ratio L/e of between 10 and 100, and in which the smallest dimension e, such as e≤1 μm, is negligible compared with the other two dimensions L and I. Two-dimensional metal or metal alloy particles or 2D metal or metal alloy particles can thus be referred to.

It is specified that the measurements of the dimensions L, I and e are carried out by a direct method:

- by means of a scanning electron microscope (SEM) for values of dimensions greater than or equal to 100 nm, and
- by means of a transmission electron microscope (TEM) for values between 20 nm and 100 nm.

For dimensions less than or equal to 20 nm, and especially to determine the dimension of the smallest dimension e, the measurement can be carried out by an indirect measurement, by applying the following formula, the sheets being considered flat cylindrical and of small thickness e:

$$\frac{1}{\rho.S_{BET}} = \frac{R.e}{2(R+e)}$$

with

ρ: density of the powder $S_{BET}$: specific surface area of the powder

R: mean radius of the sheets e: mean thickness of the sheets

According to the invention, these metal or metal alloy particles can be obtained by the method for cryogenic-fluid grinding a metal or metal alloy powder previously defined.

More particularly, these metal or metal alloy particles can be obtained by a method for preparing particles from a metal or metal alloy powder comprising the following steps:

- introducing a cryogenic fluid into an attrition grinder comprising attrition means,
- (b) introducing the powder into the attrition grinder,
- (c) rotatably moving the attrition grinder, whereby cryogenic grinding of the powder into particles is carried out, and
- (d) optionally collecting the particles, and wherein

- the metal(s) of the powder are selected from Au, Ag, Cu, Al, Sn, Pt, Pd, Pb, Zn, Fe and Ni,
- the ratio $V_{MA}/(V_{MA}+V_{FC})$ of the attrition means volume $V_{MA}$ to the sum of the attrition means volume $V_{MA}$ and the cryogenic fluid volume $V_{FC}$ is such that $0.2 \geq V_{MA}/(V_{MA}+V_{FC}) \geq 0.7$, and
- the rotational speed of the attrition grinder, during step (c), is between 100 rpm and 20,000 rpm.

According to a particular variant, the metal(s) of the powder are selected from Au, Ag, Cu, Al, Sn, Pt, Pd, Zn and Fe, advantageously from Ag, Sn and Cu, the metal or one of the metals preferably being Cu.

According to a particular variant, the metal or metal alloy particles according to the invention have the following complementary characteristics:

- a static angle of repose, denoted as Θ and measured in accordance with ISO 9045:1990(fr) of between 30° and 60°, and/or a secondary dynamic angle of repose, denoted as Θs, of between 80° and 130°.

As illustrated in FIG. 1 which depicts a diagram from a thesis by B.-J. R. Mungyeko Bisulandu held on 6 Mar. 2018 and entitled "Modelling the energy input by alternative fuels in cement production rotary kilns", the static angle of repose Θ, also referred to as the angle of repose or the natural angle of repose, is the angle that the slope of a pile of uncompacted stacked material makes with the horizontal. This static angle of repose Θ is determined in accordance with ISO 9045: 1990(fr) entitled "Industrial Screens and Screening".

As also illustrated in this same FIG. 1, the secondary dynamic angle of repose Θs is determined by subjecting a pile of uncompacted stacked material to rotation until the slope formed by the pile is broken and corresponds to the angle that this broken slope makes with the horizontal. This secondary dynamic slope angle Θs can be determined in accordance with the protocol described in the thesis by S. Courrech du Pont held on 14 Nov. 2003 and entitled "Granular avalanches in a fluid medium".

These particular values of static and secondary dynamic angles of repose exhibited by the metal or metal alloy particles according to the invention reflect a completely original rheological behaviour of these particles, which can be explained by their very particular morphology.

According to a particular variant, the metal or metal alloy particles according to the invention further have at least one of the following complementary morphological characteristics:

a sheet flatness tolerance of less than or equal to 200 nm, and a sheet convexity deviation of less than or equal to 10%.

Flatness expresses the nature of a surface having all its elements inscribed in a plane. With reference to FIG. 1, the flatness tolerance corresponds to the height, denoted as h, of the zone bounded by the two parallel planes marked in dotted lines inside which the surface in question has to lie. Within the scope of the present invention, this sheet flatness tolerance is less than or equal to 200 nm.

The convexity deviation corresponds to the ratio of the total surface area of a sheet, represented in grey in FIG. 3, to the sum of the surface area in grey and the surface area represented in white in FIG. 3.

Thirdly, the invention relates to various uses of the metal or metal alloy particles just described.

According to the invention, these metal or metal alloy particles can be used for making a piece comprising a metal coating on all or part of one of its surfaces.

Such a metal coating may especially be intended to protect, treat or decorate all or part of the said surface of the piece.

These metal or metal alloy particles, like the piece just mentioned, can be used in many fields, in particular in the mechanical industry, in the electronics or microelectronics industry, in the optics field, in the construction field, in the packaging field, in the design field, in the cosmetics field or in the medical or paramedical field.

Fourthly, the invention relates to a method for coating a material.

According to the invention, this method comprises the following steps:

preparing metal or metal alloy particles by implementing a method as defined above, in the case where the powder is a metal or metal alloy powder, the metal(s) being selected from Au, Ag, Cu, Al, Sn, Pt, Pd, Pb, Zn, Fe and Ni, and the ratio $V_{MA}/(V_{MA}+V_{FL})$ is such that $0.2 \geq V_{M}A/(V_{MA}+V_{FL})$ 0.7, and then (2) depositing the metal or metal alloy particles prepared in step (1) onto all or part of the material, whereby a coated material is obtained.

By implementing the metal or metal alloy particles being characterised by the particular morphological properties previously detailed, the coating method according to the invention makes it possible to obtain a material comprising a homogeneous metal coating, while limiting the amount of metal or metal alloy particles required to make this coating.

As will be seen from the examples below, metal or metal alloy coatings being characterised by a surface coverage of at least 5 g/m$^2$, or even at least 10 g/m$^2$, can easily be obtained.

It should be noted that such a coverage is relatively close to a deposit equivalent to a single layer. Indeed, considering a mean thickness e of 1 μm, the mass M of a single-layer coating of copper particles per square metre is expressed as follows:

M=e.S.ρ with e: mean thickness of the sheets

S: surface area

ρ: density of the powder

In the case of copper particles, this surface density is in the order of 9 g/m$^2$.

As will also be seen from the examples below, metal coatings can also allow a concealment rate greater than 400 to be achieved.

With regard to step (1) of preparing the metal or metal alloy particles, reference may be made to what has been previously described in connection with the preparation of these particles, the advantageous characteristics of this method can be taken alone or in combination.

Step (2) of the coating method according to the invention consists in depositing the metal or metal alloy particles onto all or part of the material to obtain a coated material.

This deposition step (2) can be done by any coating method conventionally used to form, from a powder, a metal coating on a material, including the methods of the state of the art discussed above (paints, inks, etc.). Besides, the generation of a cryogenic suspension of charged metal or metal alloy particles makes it possible to carry out an immersion deposition of the surfaces to be coated (bath deposition).

Advantageously, the deposition step (2) is carried out by electrostatic attraction or by applying a potential difference between the metal or metal alloy particles according to the invention and the surface(s) of the material onto which the deposition is to be carried out.

For this, two charging techniques can be used. The first technique consists in applying an electric field in line with the metal or metal alloy particles for a time during which these metal or metal alloy particles will become electrically charged. The second technique consists in carrying out the electrical charging by tribology, that is, by tearing off surface electrons by rubbing the metal or metal alloy particles in line with a surface. As tribological charging is generally more effective and also easier to implement, this second technique is preferred.

The deposition methods just mentioned have the advantage of being relatively easy to implement industrially and of not resorting to heavy and costly industrial facilities. Furthermore, in the case of deposition by co-grinding, in a bath, by electrical charging or even by lamination, the metal or metal alloy particles can be deposited in the absence of solvents or any other additive that could present a health and/or environmental hazard.

At the end of the deposition step (2), the strength and/or durability properties of the coating can be enhanced by implementing a step (3) aiming at consolidating the coating over all or part of the material.

Thus, according to a particular embodiment, the coating method according to the invention may further comprise a step (3) of applying energy, such as thermal energy, for example by heating the coated surface, or a complementary coating, for example of the lacquer or varnish type.

The coating method according to the invention can be implemented on a material which can be in divided form or in the form of one piece.

When this material is in divided form, it can especially be in granular or platelet form, and this divided form can be subsequently transformed into one piece.

When this material is in the form of one piece, this piece can just as easily be a new piece, that is, a piece that has never been used before, or a piece undergoing maintenance, which corresponds to a piece that has already been used and whose properties are to be improved by applying a coating.

Fifthly and sixthly, the present invention relates, to the material comprising a metal coating as well as to its uses, this coated material being obtained by the coating method as defined above, the advantageous characteristics of this method can be taken alone or in combination.

Like the metal or metal alloy particles previously described, this coated material can in particular be used in the mechanical industry, in the electronics or microelectronics industry, in the optics field, in the construction field, in the packaging field, in the design field, in the cosmetics field or in the medical or paramedical field.

By way of non-limiting examples, when the metal particles are copper particles, they can advantageously be used, like the coated materials obtained from such particles, in the medical or paramedical field to impart bactericidal and virucidal properties.

It may also be contemplated to implement the coating method according to the invention with tin particles, with silver and copper particles or with silver and copper alloy particles, to make printed or electronic circuits comprising tin, silver and copper coatings or silver and copper alloy coatings respectively, tin and copper being good electrical conductors, instead of the current very expensive silver coatings.

Other characteristics and advantages of the invention will become clearer upon reading the following description, which relates to examples of preparation of $Fe_3O_4$ iron oxide particles, silica particles and copper particles, making of metal coatings by means of these copper particles on different surfaces (polycarbonate, glass, graphite), as well as characterisation of these particles and metal coatings.

Of course, these examples are given only by way of illustration of the object of the invention and in no way constitute a limitation of this object.

Figure 1:
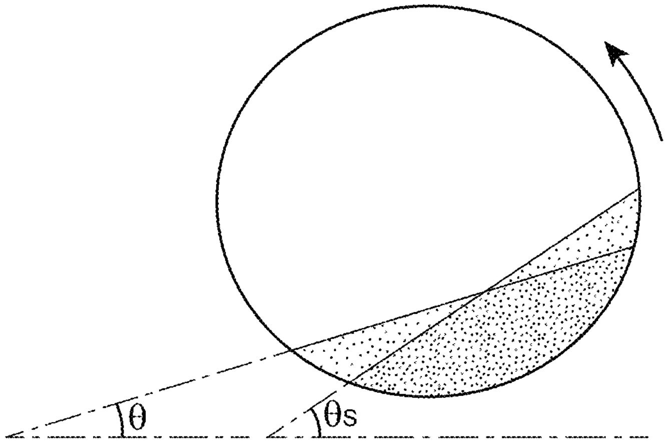
FIG. 1 schematically illustrates the static angle of repose and secondary dynamic angle of repose characteristics.
Figure 2:
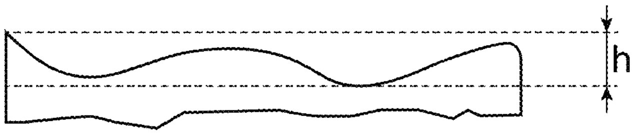
FIG. 2 schematically illustrates the flatness tolerance characteristic of a sheet.
Figure 3:
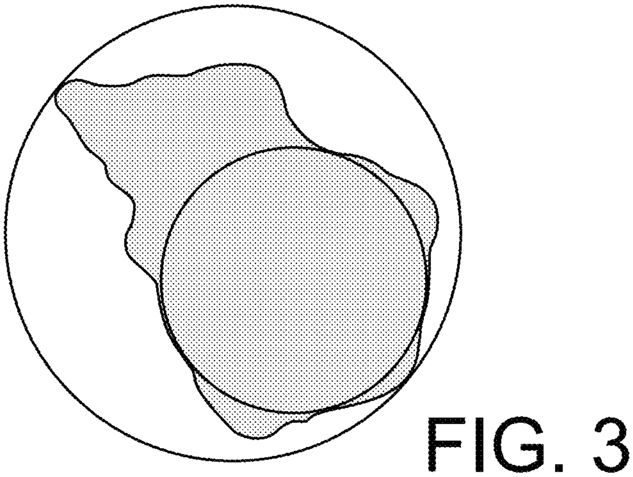
FIG. 3 schematically illustrates the convexity deviation characteristic of a sheet.
Figure 4:
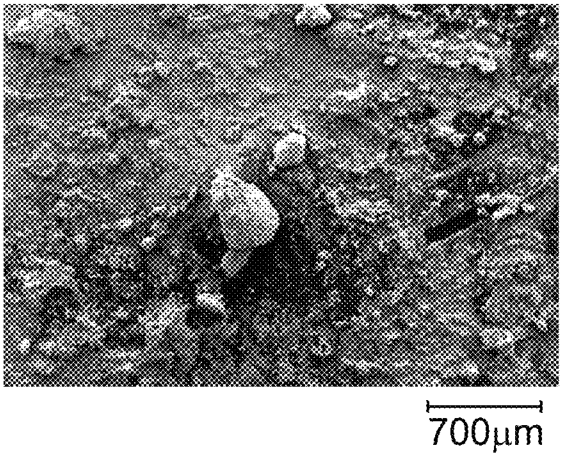
FIG. 4, FIG. 5 and FIG. 6 correspond respectively to pictures taken by means of a scanning electron microscope (SEM) of the $Fe_3O_4$ powder $P_1$ used in example 1 to prepare the metal oxide particles according to the invention, of the powder $P_2$ resulting from a first grinding and then of the powder $P_3$ resulting from the second grinding.
Figure 5:
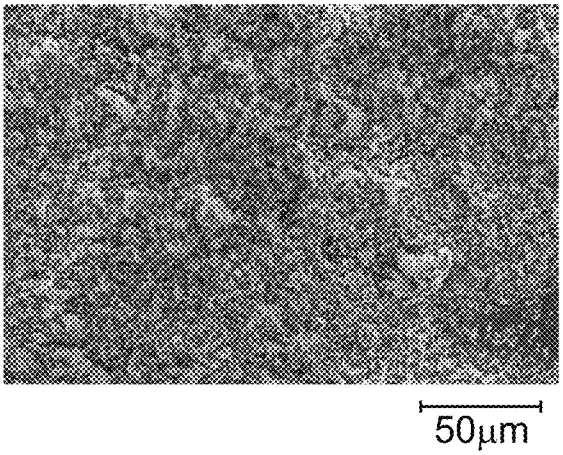
Figure 6:
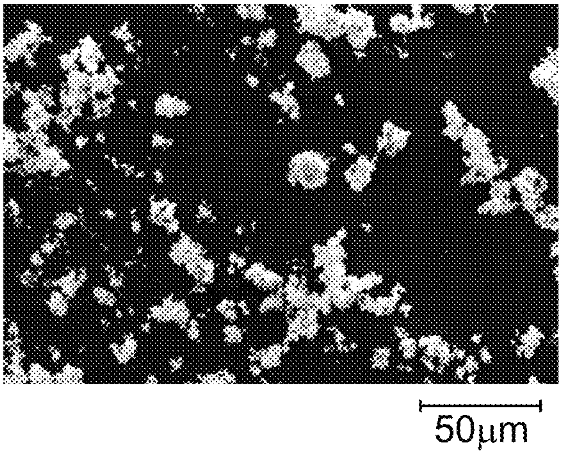

It is specified that FIG. 1, FIG. 2 and FIG. 3 have already been discussed in the section "Disclosure of the invention" above.

DETAILED DISCLOSURE OF PARTICULAR EMBODIMENTS

Example 1: Grinding $Fe_3O_4$ Iron Oxide Particles

An $Fe_3O_4$ iron oxide powder, denoted as $P_1$, has been subjected to two successive grinding steps, by implementing liquid nitrogen as the cryogenic fluid and attrition means formed by zirconia beads of different diameters.

For implementing the first grinding step, 125 ml ($V_{FL}$) of liquid nitrogen and then 27.8 g of $Fe_3O_4$ have been introduced into an attrition grinder of the type represented in FIG. 1 or 3 of document WO2017/076944 A1 and comprising 125 ml ($V_{MA}$) of beads having a diameter of 5 mm.

In this first grinding step, the ratio $V_{MA}/V_{MA}+V_{FL})$ is therefore equal to 0.50.

The attrition grinder has then been rotatably moved at a rotational speed of 1250 rpm for a duration of 90 minutes.

At the end of this first grinding step, the zirconia beads and 24.4 g of ground $Fe_3O_4$ powder $P_2$ have been extracted from the attrition grinder.

A sample of the $Fe_3O_4$ powder $P_2$ thus prepared has been analysed. The specific surface area of the $Fe_3O_4$ powder $P_2$ obtained at the end of this first grinding step, as measured according to the BET method, by nitrogen adsorption at the boiling temperature of liquid nitrogen (−196° C.), is in the order of 10 $m^2/g$.

For implementing the second grinding step, 125 ml ($V_{MA}$) of zirconia beads having a diameter of 1.25 mm and then 17.5 g of $Fe_3O_4$ powder $P_2$ have been introduced into the attrition grinder.

In this second grinding step, the ratio $V_{MA}/(V_{MA}+V_{FL})$ is still equal to 0.50, the volume $V_{FL}$ of liquid nitrogen still being 125 ml.

The attrition grinder has then been rotatably moved again at a rotational speed of 1250 rpm for a duration of 90 min.

At the end of this second grinding step, the zirconia beads and 9.2 g of ground $Fe_3O_4$ powder $P_3$ have been extracted from the attrition grinder.

A sample of the $Fe_3O_4$ powder $P_3$ thus prepared has been analysed. The specific surface area of the powder $P_3$ obtained after this second grinding step, as measured according to the BET method, by nitrogen adsorption at the boiling temperature of liquid nitrogen (−196° C.), is in the order of 30 $m^2/g$.

FIG. 1, FIG. 2 and FIG. 3 correspond to the SEM pictures of $Fe_3O_4$ powders $P_1$, $P_2$ and $P_3$ respectively.

Figure 7:
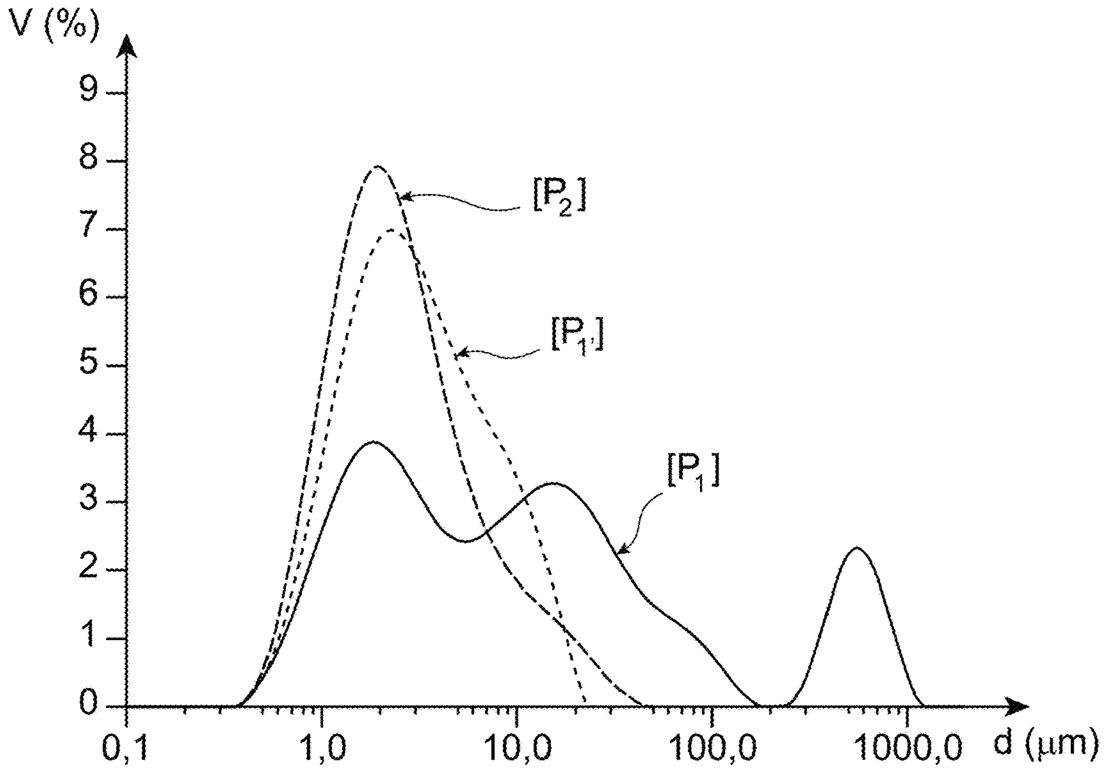
FIG. 7 illustrates the time course of the grain size of the powder $P_1$ of FIG. 4 (curve denoted as $P_1$), of the powder $P_1'$ obtained after 30 min of implementation of the first grinding step (curve denoted as $P_1'$) and of the powder $P_2$ obtained at the end of the first grinding step (curve denoted as $P_2$), this time course being evaluated by the percent by volume (denoted as V and expressed in %) as a function of the mean diameter of the particles (denoted as d and expressed in μm).

The time course of the grain size of the $Fe_3O_4$ particles before grinding, during and at the end of the first grinding step has been monitored and is represented in FIG. 7. The corresponding curves, which illustrate the percent by volume as a function of the mean diameter of the $Fe_3O_4$ particles forming the powders $P_1$, $P_1'$, and $P_2$, are denoted as [$P_1$], [$P_1'$] and [$P_2$] respectively in FIG. 7. It is specified that this mean diameter of the $Fe_3O_4$ particles of the powders $P_1$, $P_1'$, and $P_2$ has been measured by the laser granulometry method (via laser diffraction).

Figure 8:
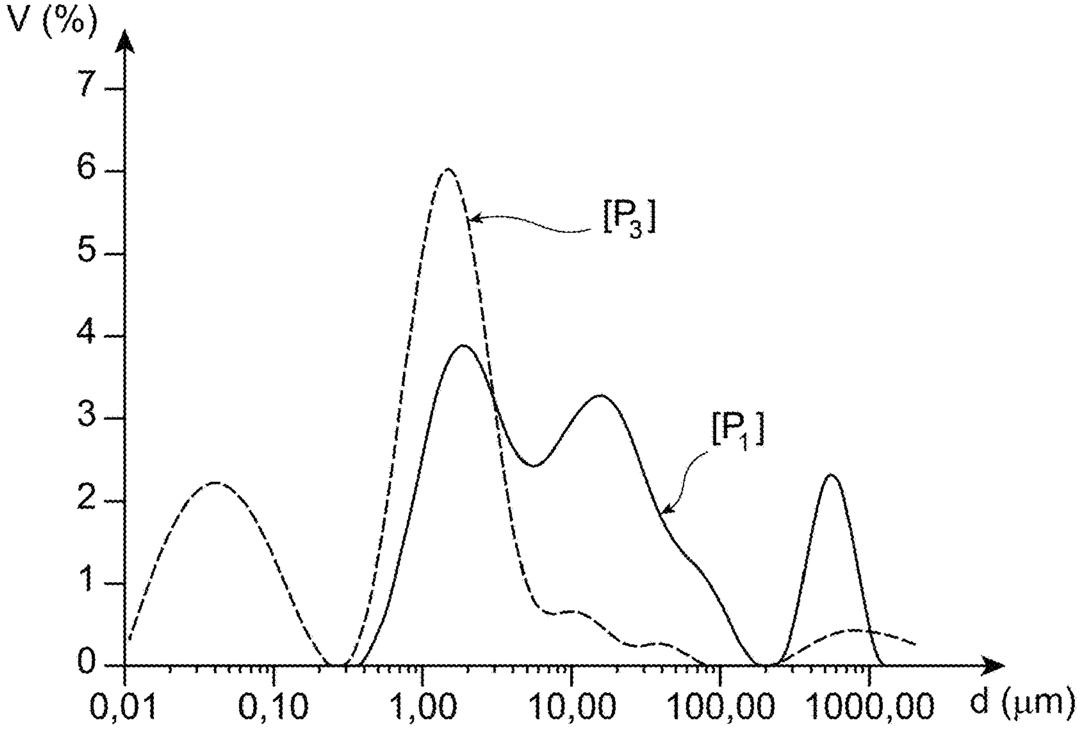
FIG. 8 illustrates the time course of the grain size of the powder $P_1$ of FIG. 4 (curve denoted as $P_1$) and of the powder $P_3$ obtained at the end of the second grinding step (curve denoted as $P_3$), this time course being evaluated by the percent by volume (denoted as V and expressed in %) as a function of the mean diameter of the particles (denoted as d and expressed in μm).

The time course of the grain size of the $Fe_3O_4$ particles before grinding and after the second grinding step has been monitored and is represented in FIG. 8. The corresponding curves, which illustrate the percent by volume as a function of the mean diameter of the $Fe_3O_4$ particles forming the powders $P_1$ and $P_3$, are denoted as [$P_1$] and [$P_3$] respectively in FIG. 8. It is specified that this mean diameter of the $Fe_3O_4$ particles of the powders $P_1$ and $P_3$ has also been measured by the laser granulometry method (via laser diffraction).

Example 2: Grinding $SiO_2$ Silica Particles

An $SiO_2$ silica powder, denoted as $P_4$, has been subjected to two successive grinding steps, by implementing liquid nitrogen as the cryogenic fluid and attrition means formed by zirconia beads of different diameters.

For implementing the first grinding step, 125 ml ($V_{FL}$) of liquid nitrogen and then 12.7 g of $SiO_2$ powder, denoted as $P_4$, have been introduced into an attrition grinder in accordance to that represented in FIG. 1 or 3 (but comprising only a single stage) of document WO02017/076944 A1 and comprising 125 ml ($V_{MA}$) of beads having a diameter of 3 mm.

In this first grinding step, the ratio $V_{MA}(V_{MA}+V_{FL})$ is therefore equal to 0.5.

The attrition grinder has then been rotatably moved at a rotational speed of 1250 rpm for a duration of 10 minutes.

At the end of this first grinding step, the zirconia beads and 12.2 g of ground $SiO_2$ powder $P_5$ have been extracted from the attrition grinder.

For implementing the second grinding step, 125 ml ($V_{MA}$) of zirconia beads having a diameter of 1.25 mm and 5.6 g of the $SiO_2$ powder $P_5$ have been introduced into the attrition grinder.

In this second grinding step, the ratio $V_{MA}/(V_{MA}+V_{FL})$ is still equal to 0.5, the volume $V_{FL}$ of liquid nitrogen being 125 ml.

The attrition grinder has then been rotatably moved again at a rotational speed of 1250 rpm for a duration of 10 min.

At the end of this second grinding step, the zirconia beads and 4.7 g of ground $SiO_2$ powder $P_6$ have been extracted from the attrition grinder.

Figure 9:
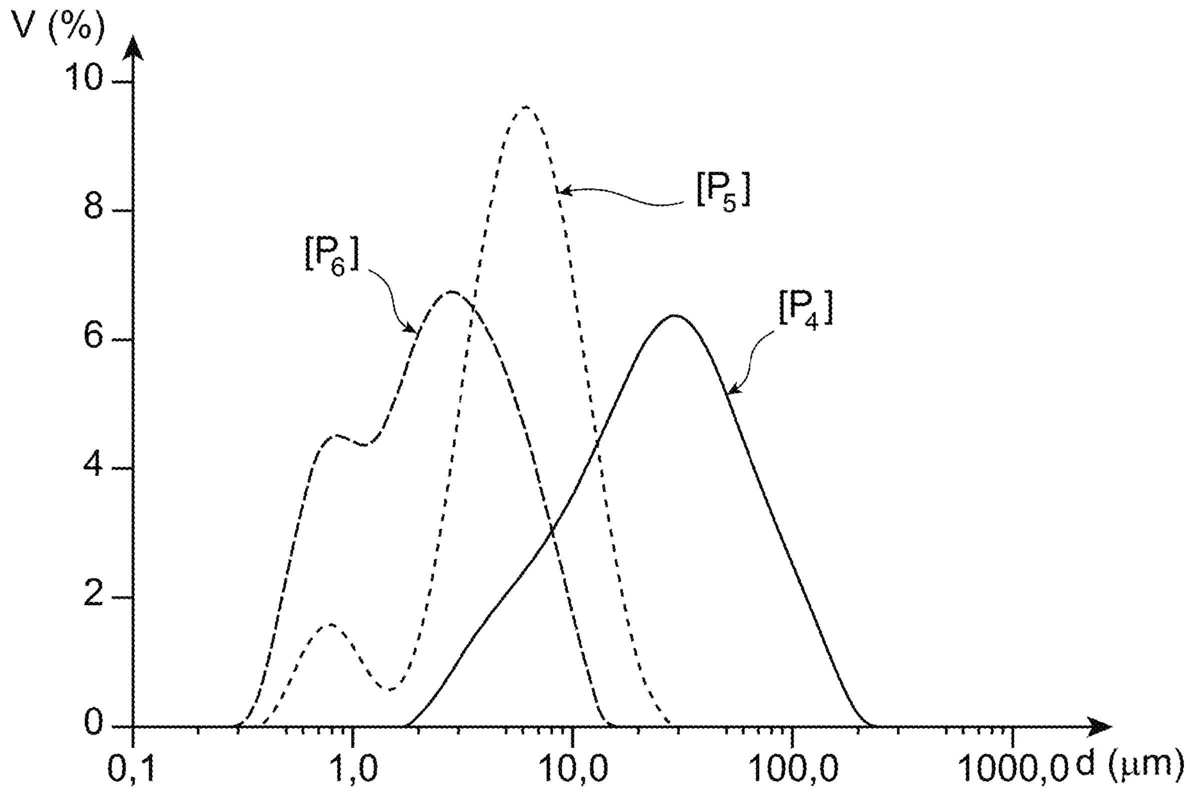
FIG. 9 illustrates the time course of the grain size of the silica powder $P_4$ before grinding (curve denoted as $P_4$), of the powder $P_5$ obtained at the end of the first grinding step (curve denoted as $P_5$) and of the powder $P_6$ obtained at the end of the second grinding step (curve denoted as $P_6$), this time course being evaluated by the percent by volume (denoted as V and expressed in %) as a function of the mean diameter of the particles (denoted as d and expressed in μm).

The time course of the grain size of the $SiO_2$ particles before grinding, after the first grinding step and then after the second grinding step has been monitored and is represented in FIG. 9. The corresponding curves, which illustrate the percent by volume as a function of the mean diameter of the $SiO_2$ particles forming the powders $P_4$, $P_5$ and $P_6$, are denoted as [$P_4$], [$P_5$] and [$P_6$] respectively in FIG. 9. It is specified that this mean diameter of the silica particles of the powders $P_4$, $P_5$ and $P_6$ has been measured by the laser granulometry method (via laser diffraction).

Example 3: Preparing Copper Particles in Accordance with the Invention

The metal particles in accordance with the invention have been prepared from a so-called "millimetric" copper powder, hereinafter denoted as $P_7$.

Figure 10:
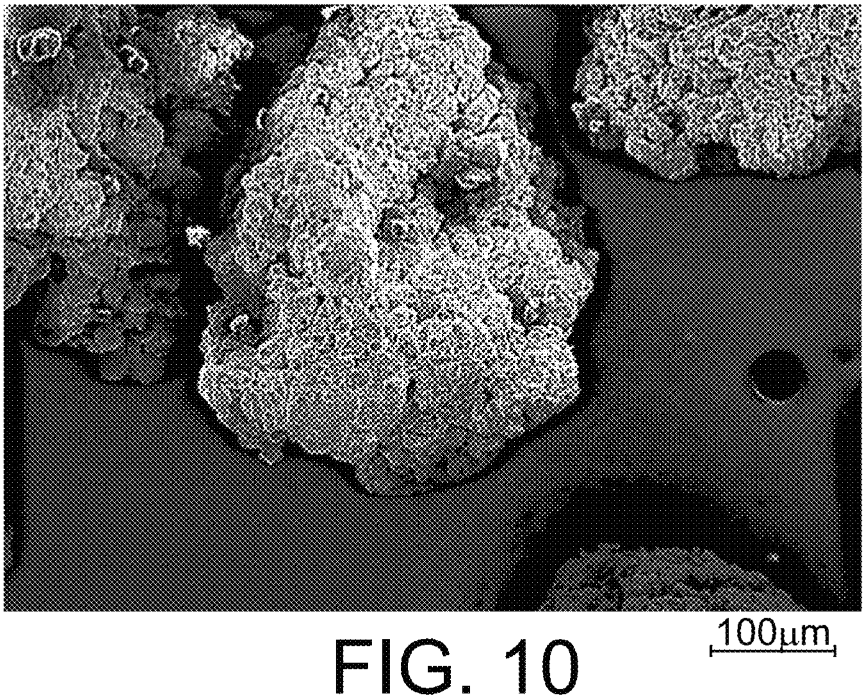
FIG. 10 corresponds to a picture taken by means of a scanning electron microscope (SEM) of the copper powder used to prepare the metal particles according to the invention.

With reference to FIG. 10, which corresponds to the SEM picture of this copper powder $P_7$, it is observed that the latter is formed of three-dimensional particles whose three dimensions e, I and L are of the same order of magnitude, between 300 μm and 500 μm. The particles of this copper powder are clearly not in the form of sheets.

This copper powder $P_7$ has been subjected to two successive grinding steps, by implementing liquid nitrogen as the cryogenic fluid and attrition means formed by zirconia beads of different diameters.

For implementing the first grinding step, 200 ml ($V_{FL}$) of liquid nitrogen and then 5 g of copper powder $P_7$ have been introduced into a single-stage attrition grinder in accordance to that represented in FIG. 4, FIG. 5, FIG 6 or FIG. 8 of document WO02017/076944 A1 and comprising 125 ml ($V_{MA}$) of beads having a diameter of 5 mm.

In this first grinding step, the ratio $V_{MA}/(V_{MA}+V_{FL})$ is therefore equal to 0.38.

The attrition grinder has then been rotatably moved at a rotational speed of 1200 rpm for a duration of 30 minutes.

At the end of this first grinding step, all of the 5 mm diameter zirconia beads have been removed from the attrition grinder and a sample of the copper powder, denoted as $P_8$, thus prepared has been collected and analysed.

The aspect ratio of the copper particles forming this powder $P_8$, which corresponds to the ratio L/e of the largest dimension to the smallest dimension, is 50.

For implementing the second grinding step, 125 ml ($V_{MA}$) of zirconia beads having a diameter of 1.25 mm have been introduced into the attrition grinder.

In this second grinding step, the ratio $V_{MA}/(V_{MA}+V_{FL})$ is equal to 0.38, the volume $V_{FL}$ of liquid nitrogen being still 200 ml.

The attrition grinder has then been rotatably moved again at a rotational speed of 1200 rpm for a duration of 30 min.

At the end of this second grinding step, all of the 1.25 mm diameter zirconia beads have been removed from the attrition grinder and the copper powder thus prepared, denoted as $P_9$, has been collected and analysed.

The aspect ratio, or ratio L/e, of the copper particles forming this copper powder from the second grinding step is 10.

During this second grinding step, the sheets forming the copper powder $P_8$ are cut and, in doing so, the aspect ratio decreases.

Figure 11:
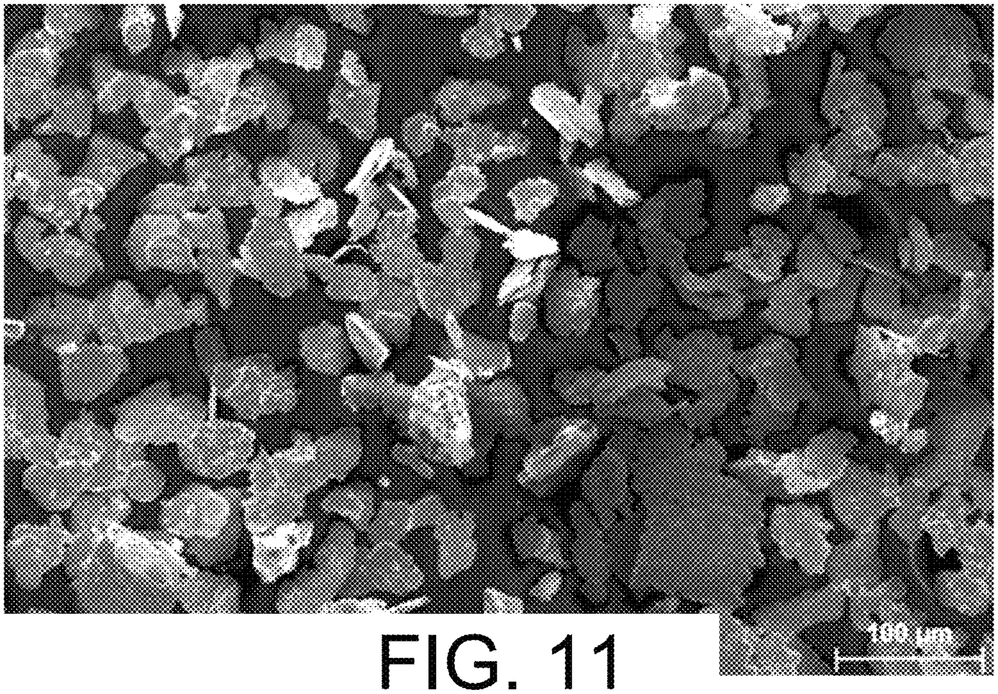
FIG. 11 corresponds to a picture taken by means of a scanning electron microscope (SEM) of the copper particles as prepared by implementing the method according to the invention.
Figure 12:
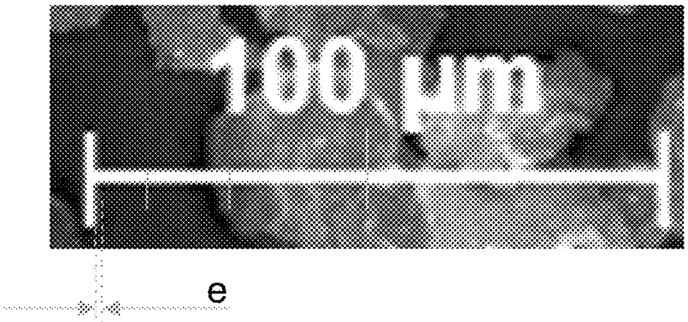
FIG. 12 and FIG. 13 correspond to an enlargement of two parts of the picture in FIG. 11, including the part with the 100 μm scale (FIG. 12).

FIG. 11 corresponds to the SEM picture of the copper powder as obtained at the end of the second grinding step. It is observed that the powder is formed of particles being in the form of sheets whose three dimensions e, I and L are no longer of the same order of magnitude at all.

Figure 13:
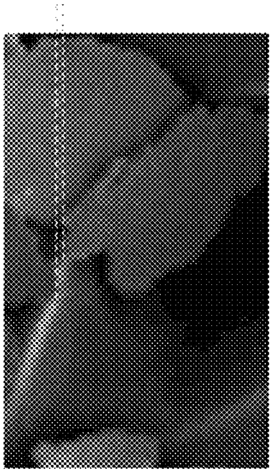

In particular, with reference to the picture in FIG. 13, it is observed that the smallest dimension e of the sheets is in the order of 1 μm.

The specific surface area of the copper powder $P_9$ obtained at the end of the second grinding step, as measured according to the BET method, by nitrogen adsorption at the boiling temperature of liquid nitrogen (−196° C.), is in the order of 28 $m^2/g$.

Figure 14:
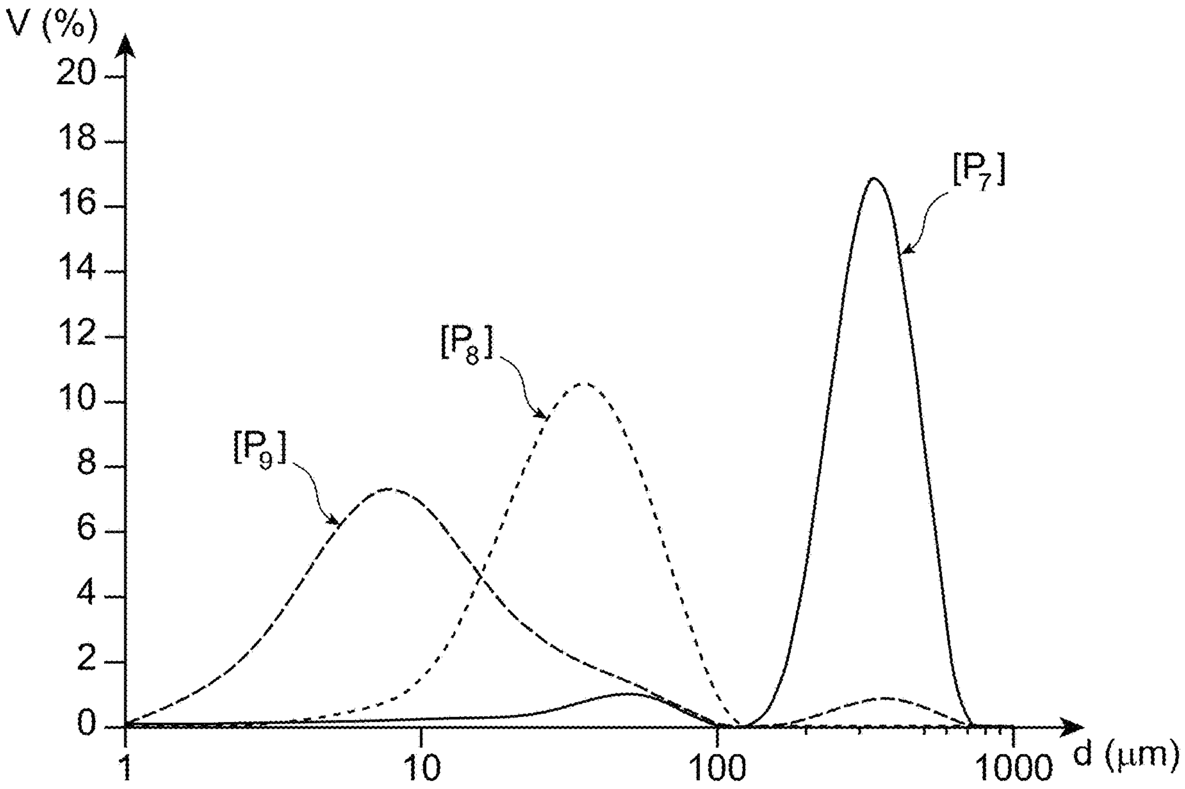
FIG. 14 illustrates the time course of the grain size of the copper particles forming the powder in FIG. 10, of the copper particles forming the powder as obtained after the first grinding step and of the copper particles forming the powder as obtained after the second grinding step, this time course being evaluated by the percent by volume (denoted as V and expressed in %) as a function of the mean diameter of the particles (denoted as d and expressed in μm).

The time course of the grain size of the copper particles before grinding, after the first grinding step and after the second grinding step has been monitored and is represented in FIG. 14. The corresponding curves, which illustrate the percent by volume as a function of the mean diameter of the copper particles forming the powders $P_7$, $P_8$ and $P_9$, are denoted as [$P_7$], [$P_8$] and [$P_9$] respectively in FIG. 14. It is specified that this mean diameter of the copper particles of the powders $P_7$, $P_8$ and $P_9$ has been measured by the laser granulometry method (via laser diffraction).

Figure 15:
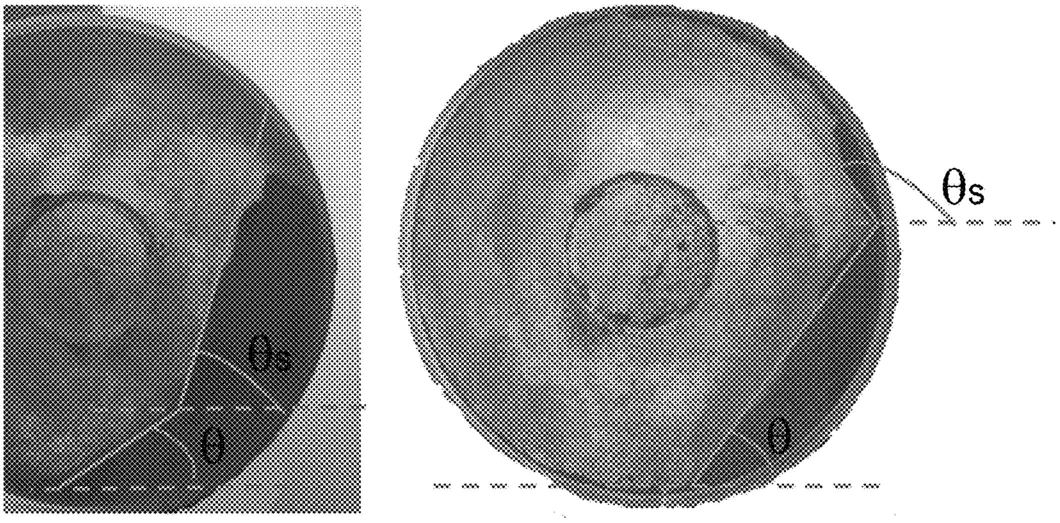
FIG. 15 shows two photographic pictures illustrating the angle of repose Θ and the dynamic secondary angle of repose Θs of the powder $P_9$ according to the present invention.

FIG. 15 shows the angles of repose as presented by the powder $P_9$. It is observed that the powder $P_9$ is characterised by a secondary dynamic angle of repose Θs negative relative to the vertical or greater than 90° relative to the horizontal. This atypical property is especially related to the particular morphology of the copper particles in the powder $P_9$.

Example 4: Making Metal Coatings on Polycarbonate Surfaces

A first deposition of 0.1 g of powder $P_9$ as prepared in accordance with the protocol in example 3 above, has been performed by electrostatic spraying onto the inner lateral surface of a polycarbonate cylinder 5 cm high and 1 cm in radius.

Figure 16:
FIG. 16 is a photographic picture of a metal coating made by the method according to the invention on a cylindrical polycarbonate support.

As shown in the photographic picture in FIG. 16, a uniform single-layer coating is obtained, being characterised by a coverage of 31.83 $g/m^2$.

A second deposition has been performed, by electrostatic deposition, of 0.02 g of this same powder $P_9$ onto one of the faces of a square polycarbonate plate with 3.5 cm sides.

Figure 17:
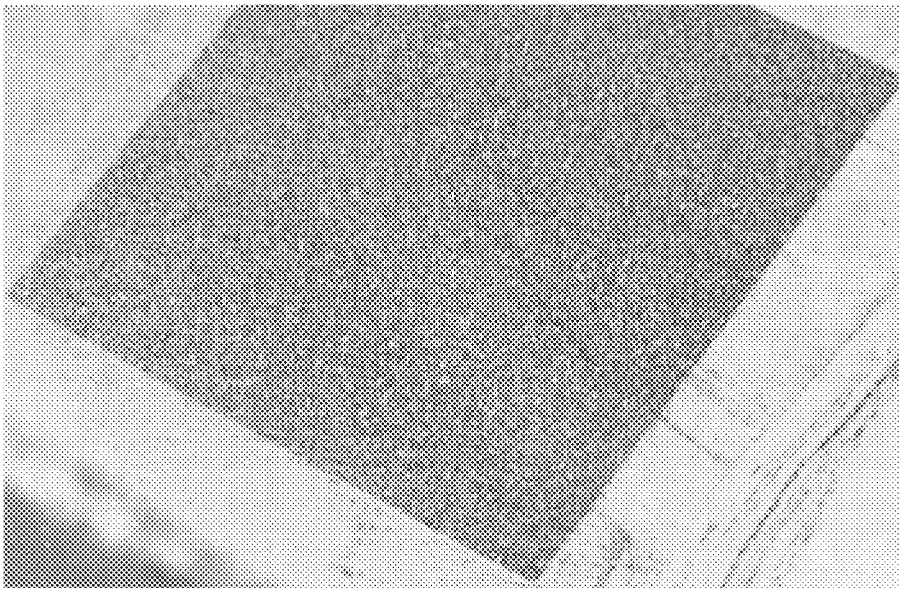
FIG. 17 is a photographic picture of a metal coating made by the method according to the invention on a square polycarbonate support.

As shown in the photographic picture in FIG. 17, a uniform single-layer coating is obtained, being characterised by a coverage of 16.33 $g/m^2$.

Example 5: Making Metal Coatings on a Glass Surface

A deposition has been performed, by electrostatic deposition, of 0.02 g of the above powder $P_9$ onto one of the faces of a square glass plate with 3.5 cm sides.

Figure 18:
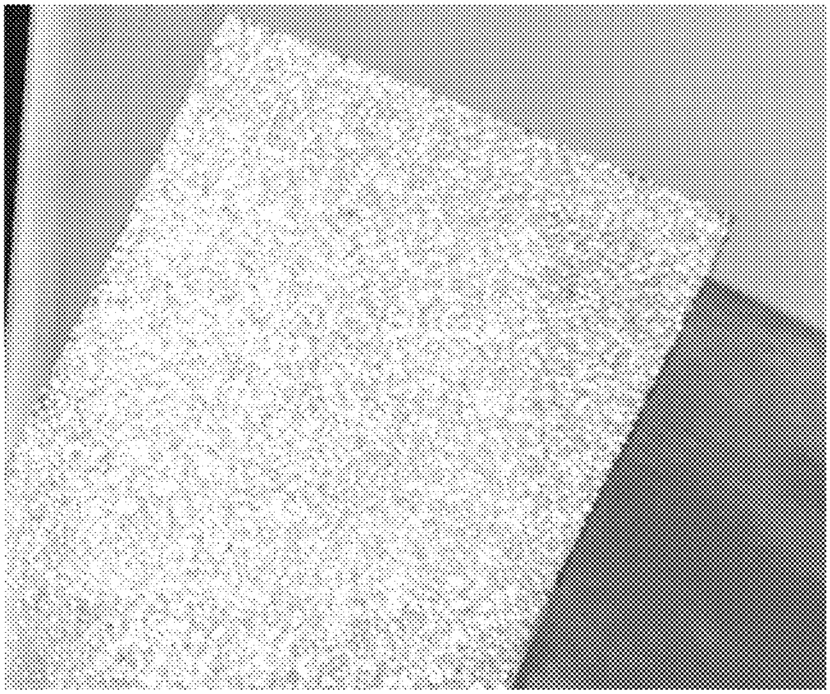
FIG. 18 is a photographic picture of a metal coating made by the method according to the invention on a square glass support.

As shown in the photographic picture in FIG. 18, a uniform coating of 16.32 $g/m^2$ is obtained on the face of the glass plate.

The evaluation of the concealment rate of the coating thus deposited onto the glass plate is carried out by measuring the ratio $I_a/I_r$ of the intensity of illuminance applied to the coated glass plate, denoted as $I_a$, to the intensity of illuminance that the coated glass plate has let through, denoted as $I_r$.

Figure 19:
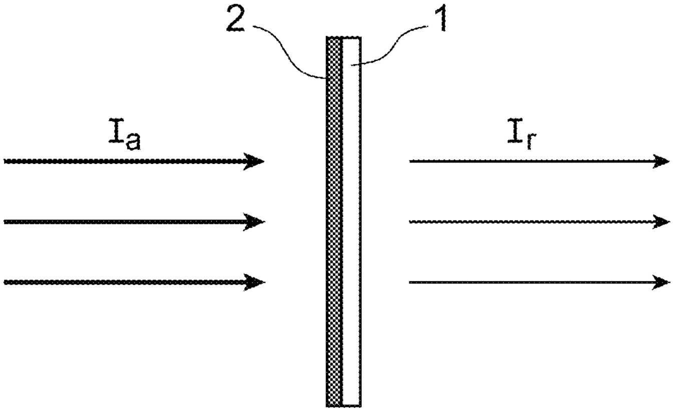
FIG. 19 is a schematic representation of the device used to determine the concealment rate provided by the metal coating in FIG. 18.

To do so, and with reference to FIG. 19, the glass plate 1 comprising the copper coating 2 is disposed vertically. The face of the plate 1 comprising the coating 2 is exposed to a horizontal intensity of illuminance $I_a$ of 55,000 lux. The horizontal intensity of illuminance $I_r$ reflected by the plate 1 is 120 lux.

The single-layer copper coating made in this example 5 is therefore characterised by a concealment rate $I_a/I_r$ of 458.33.

Example 6: Making Metal Coatings on a Graphite Surface

A deposition by electrostatic attraction of the powder $P_9$ of example 3 has been performed onto a graphite lead having a diameter of 1 μm.

This deposition has been carried out by contacting the powder $P_9$ with the graphite lead of opposite electrical charge to this powder $P_9$.

Figure 20:
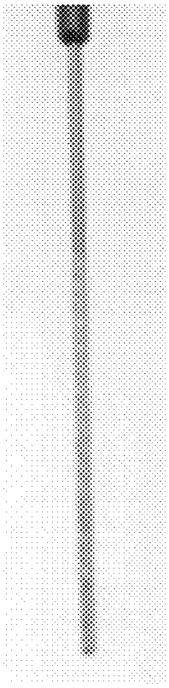
FIG. 20 is a photographic picture of a metal coating made by the method according to the invention on a graphite lead.

The photographic picture in FIG. 20 illustrates the copper coating thus obtained and shows the propensity of the metal powder according to the invention to deposit uniformly by simple contact, even onto a small surface.

What is claimed is:

1. A method for cryogenic-fluid grinding at least one powder, said method comprising the following steps:

(a) introducing a cryogenic fluid into an attrition grinder comprising attrition means, (b) introducing the powder(s) into the attrition grinder, (c) rotatably moving the attrition grinder, whereby cryogenic grinding of the powder(s) into particles is carried out, and (d) optionally collecting the particles, and wherein the ratio $V_{MA}/(V_{MA}+V_{FC})$ of the attrition means volume $V_{MA}$ to the sum of the attrition means volume $V_{MA}$ and the cryogenic fluid volume $V_{FC}$ is between 0.2 and 0.8 and, and the rotational speed of the attrition grinder, during step (c), is between 100 rpm and 20,000 rpm.

2. The grinding method according to claim 1, wherein, the powder being a metal powder or a metal alloy powder:

the metal(s) in the powder are selected from Au, Ag, Cu, Al, Sn, Pt, Pd, Pb, Zn, Fe and Ni, and the ratio $V_{MA}/(V_{MA}+V_{FL})$ is such that $0.2 \leq V_{MA}/(V_{MA}+V_{FL}) \leq 0.7$.

3. The grinding method according to claim 2, wherein the metal(s) of the powder are selected from the group consisting of Au, Ag, Cu, Al, Sn, Pt, Pd, Zn and Fe.

4. The grinding method according to claim 1, wherein the attrition means are formed by beads, bars or rollers.

5. The grinding method according to claim 1, wherein the cryogenic fluid is selected from nitrogen, argon and krypton.

6. The grinding method according to claim 1, wherein steps (a) and (b) are implemented successively.

7. The grinding method according to claim 1, the method further comprising, after step (c), at least one complementary step (c') of rotatably moving the attrition grinder, where appropriate, with attrition means distinct from those of step (c).

8. The grinding method according to claim 7, wherein the one or more complementary steps (c') are carried out before step (d).

9. Metal or metal alloy particles obtained by a method for cryogenic-fluid grinding a metal or metal alloy powder according to claim 2, the particles being in the form of sheets having three dimensions denoted as e, I and L, e and L being respectively the smallest dimension and the largest dimension of the particles, and the metal(s) of the particles being selected from Au, Ag, Cu, Al, Sn, Pt, Pd, Pb, Zn, Fe and Ni, wherein the particles have the following morphological characteristics:

e such that $e \leq 1$ μm, a ratio L/e such that $10 \leq L/e \leq 100$, a specific surface area (measured using the BET method) greater than or equal to 1 $m^2/g$.

10. The metal or metal alloy particles according to claim 9, wherein the particles have the following characteristics:

a static angle of repose, denoted as Θ and measured in accordance with ISO 9045:1990(fr), of between 30° and 60°, and/or a secondary dynamic angle of repose, denoted as Θs, of between 80° and 130°.

11. The metal or metal alloy particles according to claim 9, wherein the particles have the following morphological characteristics:

a sheet flatness tolerance of less than or equal to 200 nm, and/or a sheet convexity deviation of less than or equal to 10%.

12. The metal or metal alloy particles according to claim 9, wherein the metal(s) are selected from Au, Ag, Cu, Al, Sn, Pt, Pd, Zn and Fe.

13. An article comprising a metal coating on one or more surfaces, the metal coating comprising the metal or metal alloy particles according to claim 9, wherein the metal coating coats all or part of one of the one or more surfaces.

14. The article according to claim 13, wherein the article is an article for use in the mechanical industry, in the electronics or microelectronics industry, in the optics field, in the construction field, in the packaging field, in the design field, in the cosmetics field or in the medical or paramedical field.

15. A method for coating a material comprising the following steps:

(1) preparing metal or metal alloy particles by implementing a method according to claim 2, and then (2) depositing the metal or metal alloy particles prepared in step (1) onto all or part of the material, whereby a coated material is obtained.

16. The coating method according to claim 15, the method further comprises a step (3) of applying energy or complementary coating to consolidate the coating on all or part of the material.

17. The coating method according to claim 15, wherein the deposition step (2) is carried out by electrostatic attraction or by applying a potential difference between the particles and the surface(s) of the material onto which the deposition is to be carried out.

18. The coating method according to claim 15, wherein the material is in divided form or in the form of one piece.

19. The grinding method according to claim 1, wherein each powder is selected from a metal powder, a metal alloy powder, a powder of one or more metal oxides, a ceramic powder, an organic powder and a graphite powder.

20. The grinding method according to claim 1, wherein the cryogenic fluid volume $V_{FC}$ is between 0.3 and 0.7.

21. The grinding method according to claim 4, wherein the attrition means are steel or ceramic.

22. The article according to claim 13, wherein the metal coating protects, treats or decorates at least part of the article.

* * * * *